Dec. 24, 1957 M. W. MARIEN 2,817,563
PISTON RING
Filed July 21, 1955 2 Sheets-Sheet 1
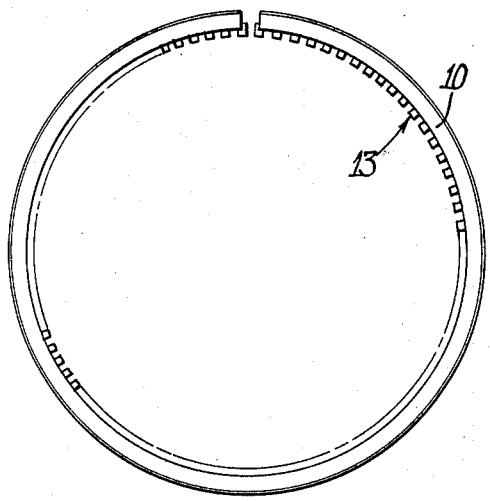
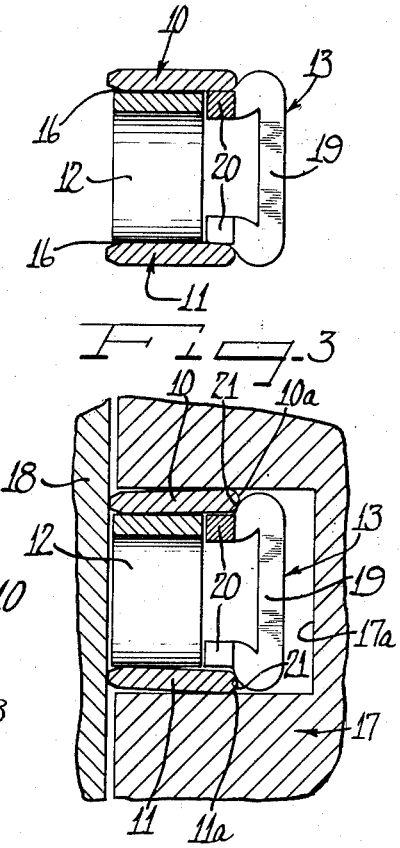
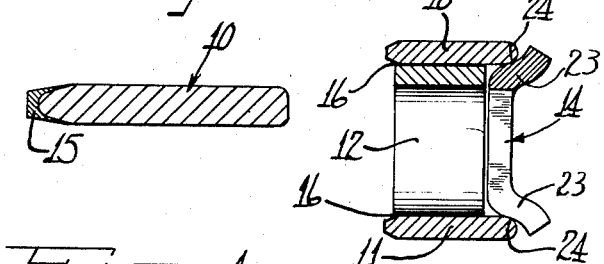
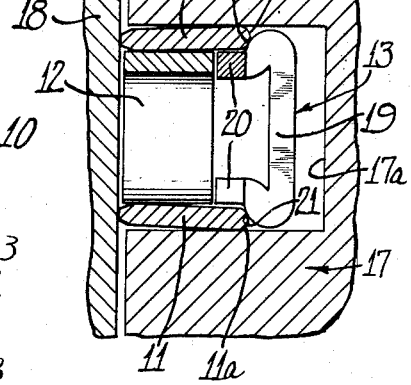
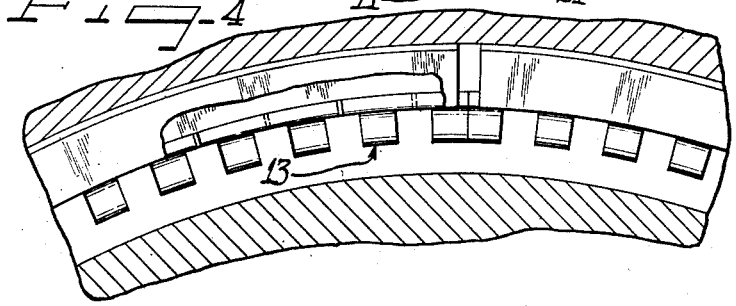
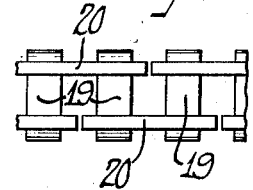
Inventor
Melvin W. Marien Dec. 24, 1957  M. W. MARIEN  2,817,563
PISTON RING
Filed July 21, 1955  2 Sheets-Sheet 2
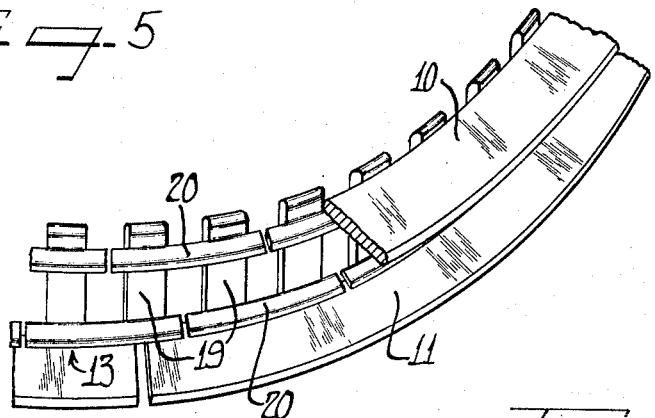
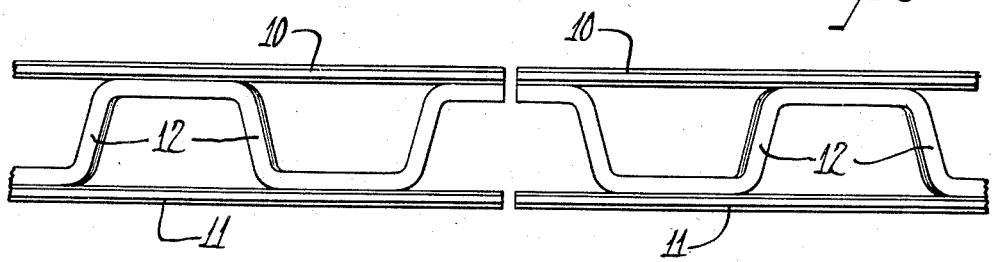
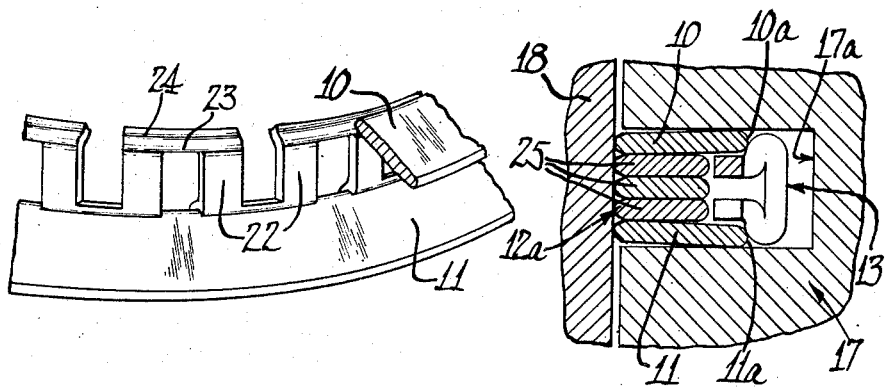
Inventor
Melvin W. Marien United States Patent Office 2,817,563
Patented Dec. 24, 1957

2,817,563

PISTON RING

Melvin W. Marien, Brentwood, Mo., assignor to Ramsey Corporation, St. Louis, Mo., a corporation of Ohio Application July 21, 1955, Serial No. 523,462

7 Claims. (Cl. 309—25)

This invention relates generally to a piston ring, and more particularly to a piston ring assembly for use in an internal combustion engine.

The present invention deals with a multi-piece piston ring assembly including a pair of axially spaced rails, an axial spacer between the rails, and a circumferential expander acting against the inner peripheries of the rail. The spacer is of less radial length than the rails thereby providing an annular area between the rails and adjacent the inner periphery thereof. The spacer may take the form of a corrugated strip thereby providing an oil control ring. In another form the spacer may be comprised of a plurality of rails in engagement with the cylinder side wall thereby providing an efficient compression ring. The circumferential expander is generally U-shaped. In one embodiment, the legs of the U extend outwardly and into the annular space provided by the rails, while in another embodiment the legs of the rail extend inwardly and the bight of the U is disposed within confines of the annular area. The circumferential expander forces the rails to dish and the inner portions of the rails to sealingly engage the sides of the piston groove. To enhance the wearing characteristics of the piston assembly, the cylinder engaging edges of the rails are chromium plated.

Inasmuch as difficulty would normally be experienced in the installation of a multi-piece piston assembly, the rails are temporarily secured to the axial spacer, whereupon a predetermined period of piston operation will free the several pieces in the piston assembly allowing the pieces to function independently.

Heretofore, multi-piece piston ring assemblies, when installed as a unit, demanded the necessity of cumbersome installation fixtures. And in many cases with the use of such fixtures, one or more pieces of the piston ring assembly would be broken during the installation procedure thereby increasing installation costs.

Accordingly, it is an object of this invention to obviate the above named difficulties and provide a piston ring assembly that may be easily and quickly installed without the use of special installation tools.

Still another object of this invention is to provide a piston ring assembly including a pair of rails axially spaced by a spacer therebetween and having a circumferential expander inside the spacer acting on the rails.

A further object of this invention is to provide a piston ring assembly having a pair of outside rails separated by spacer means wherein an expander of the circumferentially expanding type exerts a radial and an axial force on the rails causing the rails to dish and seal with the side walls of the piston groove, wherein manufacturing tolerances may be increased permitting more economical manufacturing procedures while enhancing the efficiency of the ring assembly.

Still a further feature of this invention resides in the provision of a multi-piece oil control piston ring including a pair of rails, an axial spacer, and a circumferential expander which bears against the inner peripheries of the rails causing the rails to dish to the extent that the inner portions of the rails sealingly engage the sides of the piston groove.

A still further object of this invention is to provide a multi-piece compression ring including a set of inner rails, a pair of outside rails of greater radial length than the inner rails, and a circumferential expander which bears against the inner peripheries of the outside rails causing them to dish to the extent that the inner portions of the rails sealingly engage the sides of the piston groove, thereby permitting greater tolerances in the manufacture of the various ring parts.

Other objects, features and advantages of the invention will be apparent from the following detailed description of the drawings, which illustrates the invention.

On the drawings:

Figure 1 is a plan view of a packing ring assembly in its free state before installation in accordance with the invention;

Figure 2 is an enlarged transverse sectional view of the packing ring in Figure 1;

Figure 3 is an enlarged fragmentary transverse sectional view of a piston and cylinder of an internal combustion engine showing the piston ring assembly in Figure 1 in position within a ring groove in a piston, and where the several pieces of the assembly are in a free and unattached state;

Figure 4 is an enlarged fragmentary plan view, with parts broken away to show underlying parts, of the piston ring assembly in Figure 1 and showing it in position within a ring groove of a piston;

Figure 5 is an enlarged fragmentary perspective view of the ring assembly shown in Figure 1 with parts omitted for clarity;

Figure 6 is an enlarged fragmentary end elevational view of the piston ring assembly shown in Figure 1, with the expander omitted to show the relationship of the corrugated spacer and the rails;

Figure 7 is an enlarged detail transverse sectional view of one of the rails utilized in the invention;

Figure 8 is an elevational view of the circumferential expander in the piston assembly of Figure 1, looking at the expander in a radial inward direction;

Figure 9 is an enlarged fragmentary perspective view of a piston assembly with a modified circumferential expander, with the spacer omitted for clarity;

Figure 10 is an enlarged transverse sectional view of the piston ring assembly embodying the modified expander of Figure 9, showing the parts as assembled before installation in a piston ring groove; and Figure 11 is an enlarged fragmentary transverse sectional view of a piston and cylinder of an internal combustion engine, illustrating a different form of the invention, wherein a multi-piece ring assembly takes the form of a compression ring and the several parts of the assembly are shown in their free and unattached state.

As shown on the drawings:

In the embodiments shown herein, the ring assembly generally comprises a pair of rails including an upper rail 10 and a lower rail 11 in axial space relation, an axial spacer 12, and a circumferential expander, indicated by the numeral 13 in the first embodiment as seen in Figure 2 and by the numeral 14 in the second embodiment as seen in Figure 10.

Preferably the rails 10 and 11 are constructed of steel and to lengthen the life of the oil ring assembly, the cylinder contacting edges are chromium plated as indicated by the numeral 15 in Figure 7 with respect to the upper rail 10. It is understood, however, that the rails may be employed without the chrome plating. The chrome plating 15 may then be machined, such as by grinding, to produce a cylinder contacting surface which will seat and seal with precision.

Thus, it is seen that the instant invention provides a multi-piece piston ring assembly. To facilitate the installation of this assembly, the rails 10 and 11 which are of course, split, are temporarily attached to the spacer 12.

To attach the rails to the spacer, a soldering adherent of the fugitive vanishing type may be used which disappears after use of the ring assembly. The soldering adherent may consist of a metallic combination of tin and lead with a low melting point so that the adherent will melt at about 200° F. A glue, cellulose or cement may alternatively be used which will vaporize, dissolve or otherwise pass off at any temperature less than that within the cylinder used for the piston ring during engine operation. As the adherent melts, disappears or passes off in the cylinder due to the high operating temperature, the rails detach from the spacer and work independently thereof. It may be noted that the circumferential expander 13 need not be attached to the rails inasmuch as the expander is continually biased in such a direction as to maintain its position within the rails due to its peculiar construction. As seen in Figures 2 and 10, the adherent for connecting the rails to the spacer is indicated by the numeral 16.

In Figure 3, the embodiment of Figure 1 is shown in a groove 17a of a piston 17. A cylinder wall is indicated by the numeral 18. The normal working clearance between the rails and the sides of the piston groove is provided. Because of the modern high compression engines and the high vacuums developed thereby, the normal working clearance would normally permit oil to be drawn from the inner portion of the groove over the upper rail 10 when high vacuum conditions exist in the cylinder of the engine. To alleviate such a condition, the expander member 13 is shaped to cause at least the upper rail, and preferably both rails, to bear against the adjacent side, or sides of the piston groove 17a, as indicated in the manner shown in Figure 3. Of course, as already explained, the adherent between the rails and the spacer would disappear after a predetermined period of operation of engine operation, wherein the rails separate from the spacer and function according to the features provided in their construction.

Preferably, the rails bear against the sides of the groove only adjacent their inner peripheries so that, while effecting a seal at that point, excessive friction will not be present. The circumferential expander 13 comprises a plurality of circumferentially spaced web members 19 connected by two axially spaced rows of segments 20. It is noted that the axial height of the web members 19 is greater than the axial distance between the rails 10 and 11. It is also noted that the expander 13 is generally U-shaped in cross section with the bight of the U being outside the annular area between the rails, while the legs of the U extend outwardly between the rails. The spacer 12 is of less radial length than the rails and disposed adjacent the cylinder engaging faces of the rails to provide the annular area for receiving the expander 13.

It may be noted that the circumferential expander further functions as an axial expander in bearing against the inner portions of the rails 10 and 11.

The inner peripheries of the rails are rounded as indicated by the numerals 10a and 11a. Such edges readily slide against any parts which they contact and thus will not bind as a sharp-cornered edge might do. As noted in Figures 2 and 3, the segments 20 are more or less offset from the opposite ends of the webs 19, wherein a connecting portion connects the webs with the segments and is provided with a rail contacting edge 21. The edge 21 bears radially outward and axially against the inner rounded edges of the rails 10 and 11.

Thus, the expander 13 also functions as an axial spacer with respect to the inner portions of the rails and exerts both a radially outward force component on the rails 10 and 11 to cause them to conform to the contour of the cylinder wall, and also a force component directed axially on the inner peripheries of the rails to seal the inner portions of each rail with the sides of the piston groove 17a. Inasmuch as rails of this type have a natural tendency to dish, the axial force exerted on the inner peripheries of the rails by the expander member 13 result in dishing of the rails as clearly illustrated in Figure 3. Hence, only the inner peripheral or marginal portion of the rails 10 and 11 will bear against the sides of the groove to effect a seal and very little friction results so that the rails may freely expand and contract to follow the contour of the cylinder walls.

Due to the fact that the rails dish during operation, it is realized that the manufacturing tolerances of the various parts of the ring assembly may be increased, thereby providing more economical manufacturing methods.

The modified expander 14 in Figure 10 is also generally U-shaped, but the bight of the U is disposed within the annular area provided by the rails 10 and 11 and the legs of the U extend radially inwardly. The expander generally comprises a plurality of circumferentially spaced web members 22 connected by two axially spaced rows of segments 23.

The expander member 14 similarly functions as a spacer for the inner portions of the rails 10 and 11 as was the case with respect to the expander 13. And, again the combined spacer-expander member 14 is adapted to bear both radially outward and axially against the inner peripheries of the rails 10 and 11. To provide this action, the segments 23 are bent to flare axially toward the sides of the piston groove to provide an angular rail engaging surface 24. The surface 24 engages the inner rounded ends of the rails. Thus, the member 14 exerts both a radially outward force component on the rails 10 and 11 similar to the expander 13 of the first embodiment, to cause the rails to conform to the contour of the cylinder wall, and also an axial and angular force component on the inner peripheries of the rails to cause the rails to dish. In dishing, the inner portions of the rails 10 and 11, will, of course, bear against the sides of the grooves to effect a seal therewith and prevent the flow of oil into the cylinder. While no showing is made to indicate the exact operation of the piston ring assembly utilizing the expander 14, it is to be understood that the operation is generally identical with that of the piston ring assembly utilizing the expander 13. Hence, in operation, the position of the parts in the packing ring assembly of Figure 10 will resemble the embodiment of Figure 3.

Referring now to Figure 11, a different form of spacer is provided as indicated at 12a. This spacer is comprised of three substantially identical split rails 25, although a greater or lesser number may be employed depending on the installation. Each of the rails 25 are of smaller radial length than the upper and lower outside split rails 10 and 11 thereby permitting room for the circumferential expander-spacer 13. The rails 25 may also be chrome-plated on the cylinder engaging faces similar to the outside rails 10 and 11. It will be understood that the rails 25 and the rails 10 and 11 are similarly cemented together as the spacer 12 is cemented to the rails 10 and 11 in Figure 2 prior to installation. Moreover, the circumferential expander 14 of Figure 10 may be substituted for the expander 13. Thus, it will be seen that an efficient compression ring is illustrated in Figure 11. The function of this ring assembly with respect to the outside rails 10 and 11 is the same as described in connection with the embodiment of Figures 2 and 3. Also this compression ring is more efficient in preventing blow-by due to the excellent sealing characteristics with the cylinder wall and the piston groove. Again the manufacturing tolerances of the various parts of the ring may be increased due to the sealing with the piston groove resulting from the dishing of the outside rails.

Hence, the present invention provides a unitized circumferential expander type piston ring for use in providing sealing engagement with the cylinder wall and the piston grooves. Moreover, it may be expeditiously installed without the necessity of providing cumbersome and complicated installation fixtures.

It will be understood that modifications and variations may be effected without departing from the scope of the novel concepts of the present invention, but it is understood that this application is to be limited only by the scope of the appended claims.

I claim as my invention:

1. A piston ring assembly for use in a groove of a piston comprising a pair of rails, a corrugated spacer between said rails, said spacer being of less radial length than said rails, and a substantially U-shaped circumferential expander having the bight of the U within the confines of the circular area defined by the rails and the legs extending outwardly into a portion of the annular area defined by the spaced rails.

2. A piston ring assembly for use in a groove of a piston comprising a pair of rails, a corrugated spacer between said rails, said spacer being of less radial length than said rails, and a substantially U-shaped circumferential expander having the bight of the U within the confines of the circular area defined by the rails and the legs extending outwardly into a portion of the annular area defined by the spaced rails, the bight of the U extending axially beyond the annularly defined area to force the rails radially outward and to urge the inner rail portions sealingly against the sides of the groove.

3. A piston ring assembly for use in a groove of a piston comprising a pair of rails, a corrugated spacer between said rails, said spacer being of less radial length than said rails, and a substantially U-shaped circumferential expander having the bight disposed within the annular area defined by the rails and the legs extending radially inwardly.

4. A piston ring assembly for use in a groove of a piston comprising a pair of rails, a corrugated spacer between said rails, said spacer being of less radial length than said rails, and a substantially U-shaped circumferential expander having the bight disposed within the annular area defined by the rails and the legs extending radially inwardly, and a flange at the free end of each leg to coact with legs in engaging the inner peripheries of the rails and cause the rails to dish against the sides of the groove.

5. A packing ring assembly for use in a piston groove comprising a pair of spaced rails, a spacer between said rails but of less radial length, a circumferential expander urging said rails to dish against the sides of the groove, said expander including a plurality of circumferentially arranged axially extending webs of greater length than the space between the rails, and arcuate segments connecting adjacent webs at one end, said segments nesting within the annular area defined by the spaced rails.

6. A piston ring assembly comprising a pair of outside rails, a spacer between said rails including a plurality of rails of less radial length than said outside rails, and a circumferential expander nesting between the outside rails and having flange means for bearing at an angle against the inner peripheries of said rails, whereby the expander dishes the outside rails outwardly causing the inner portions of the rails to sealingly engage the piston groove of a piston.

7. A piston ring assembly adapted for use in a groove of a piston which comprises a pair of rail rings, spacer ring means between the rail rings of less radial depth than the rail rings to provide an annular area between the rail rings inside said spacer ring means, a circumferential expander ring of generally U-shaped cross section having the bight thereof extending into said annular area and having the legs thereof extending generally radially inwardly from the bight and adapted to bear against the portions of the rail rings disposed radially inward from the spacer ring, and said legs having portions flaring axially toward the sides of the piston groove for engaging the inner peripheries of the rail rings to cause the rail rings to dish against the sides of the groove.

References Cited in the file of this patent

UNITED STATES PATENTS

| | | |
|---|---|---|
| 2,140,710 | Meisel | Dec. 20, 1938 |
| 2,175,409 | Phillips | Oct. 10, 1939 |
| 2,303,798 | Solenberger | Dec. 1, 1942 |
| 2,695,825 | Estey | Nov. 30, 1954 |